US012602542B2

(12) United States Patent　　　(10) Patent No.: US 12,602,542 B2
Oka et al.　　　　　　　　　　　(45) Date of Patent: Apr. 14, 2026

(54) TEXT ANALYSIS SYSTEM, AND CHARACTERISTIC EVALUATION SYSTEM FOR MESSAGE EXCHANGE USING THE SAME

(71) Applicant: IMatrix Holdings Corp., Kawasaki (JP)

(72) Inventors: Hibiki Oka, Kanagawa (JP); Mitsuo Kojima, Tokyo (JP); Akira Nakahashi, Kanagawa (JP)

(73) Assignee: IMatrix Holdings Corp., Kawasaki (JP)

( * ) Notice: Subject to any disclaimer, the term of this patent is extended or adjusted under 35 U.S.C. 154(b) by 165 days.

(21) Appl. No.: 18/189,819

(22) Filed: Mar. 24, 2023

(65) Prior Publication Data

US 2023/0237258 A1　　　Jul. 27, 2023

Related U.S. Application Data

(63) Continuation of application No. 17/639,866, filed as application No. PCT/JP2019/034402 on Sep. 2, 2019, now abandoned.

(51) Int. Cl.
　　　*G06F 40/30*　　　(2020.01)
　　　*G06F 16/334*　　　(2025.01)
　　　*G06F 40/205*　　　(2020.01)
(52) U.S. Cl.
　　　CPC ........ *G06F 40/205* (2020.01); *G06F 16/3344* (2019.01); *G06F 40/30* (2020.01)
(58) Field of Classification Search
　　　CPC .... G06F 40/211; G06F 40/253; G06F 40/268; G06F 40/284; G06F 40/30
　　　See application file for complete search history.

(56) References Cited

U.S. PATENT DOCUMENTS 7,558,774 B1 *　7/2009　Nakano ................. G06F 16/334
　　　　　　　　　　　　　　　　707/E17.075
8,762,302 B1 *　6/2014　Spivack ................. G06Q 50/01
　　　　　　　　　　　　　　　　706/12
(Continued)

FOREIGN PATENT DOCUMENTS

JP　　　H10227820 A　　　8/1998
JP　　　2006235949 A　　　9/2006
(Continued)

OTHER PUBLICATIONS

Neme et al., title={Stylistics analysis and authorship attribution algorithms based on self-organizing maps},journal={Neurocomputing}, vol.={147}, pp.={147-159}, year={2015}, publisher={Elsevier} (Year: 2015).*

(Continued)

*Primary Examiner* — Lamont M Spooner
(74) *Attorney, Agent, or Firm* — Slater Matsil, LLP

(57)　　　ABSTRACT

Aspects of this disclosure provide a device, system, and method for analyzing text. In an embodiment, a system is configured to convert characters of the text into a numerical time series signal. The numerical time series signal includes a time series conversion of the characters in numerical format. The system is further configured to generate a waveform with extracted information from the numerical time series signal. The extracted information having features based on politeness in language, a quantifiable use of punctuations, a quantifiable use of conjunctions, use of idioms, or a combination thereof. The system is additionally configured to determine whether the text is written by a specific user based on an analysis of the waveform against a threshold.

20 Claims, 10 Drawing Sheets

(56) References Cited

U.S. PATENT DOCUMENTS

| | | | |
|---|---|---|---|
| 9,497,023 B1* | 11/2016 | Allen | H04L 63/0478 |
| 9,529,984 B2* | 12/2016 | Raichelgauz | G06F 16/70 |
| 10,104,029 B1 | 10/2018 | Chambers et al. | |
| 10,133,865 B1* | 11/2018 | Feinman | G06N 3/0499 |
| 10,163,005 B2 | 12/2018 | Kojima et al. | |
| 10,817,604 B1* | 10/2020 | Kimball | G06F 21/563 |
| 10,869,253 B2* | 12/2020 | Barak | G06Q 10/107 |
| 11,025,649 B1* | 6/2021 | Bilge | G06N 3/09 |
| 11,216,895 B1* | 1/2022 | Schwartz | G06F 16/248 |
| 11,373,243 B2* | 6/2022 | Law | G06Q 40/06 |
| 2004/0221062 A1* | 11/2004 | Starbuck | H04L 51/212 709/207 |
| 2008/0084972 A1* | 4/2008 | Burke | H04L 63/126 379/88.02 |
| 2011/0207099 A1* | 8/2011 | Chen | A61B 5/7264 434/236 |
| 2012/0159621 A1* | 6/2012 | Jeong | G06F 21/51 726/22 |
| 2013/0080175 A1* | 3/2013 | Mori | G06F 40/117 704/E13.011 |
| 2013/0321356 A1* | 12/2013 | Al-Sharif | G06F 3/03542 345/179 |
| 2014/0173287 A1* | 6/2014 | Mizunuma | G06F 21/50 713/176 |
| 2014/0297665 A1* | 10/2014 | Stevens | G06F 16/26 707/754 |
| 2015/0242856 A1* | 8/2015 | Dhurandhar | G06Q 50/01 705/44 |
| 2015/0248476 A1* | 9/2015 | Weissinger | G06F 16/35 707/737 |
| 2015/0263999 A1* | 9/2015 | Levin | G06F 40/30 709/206 |
| 2015/0356571 A1* | 12/2015 | Chang | G06Q 30/0201 705/7.29 |
| 2016/0299982 A1* | 10/2016 | Bhave | G06F 16/90344 |
| 2016/0366080 A1* | 12/2016 | Bastide | H04L 51/212 |
| 2017/0075990 A1* | 3/2017 | Leu | G06F 11/3409 |
| 2017/0083817 A1* | 3/2017 | Di Sciullo | G06F 40/205 |
| 2017/0168751 A1* | 6/2017 | Stevens | G06F 3/0608 |
| 2017/0228460 A1* | 8/2017 | Amel | G06F 16/248 |
| 2017/0250939 A1* | 8/2017 | Bohm | H04L 67/535 |
| 2017/0255536 A1* | 9/2017 | Weissinger | G06F 16/9535 |
| 2018/0025303 A1* | 1/2018 | Janz | G16H 50/20 705/2 |
| 2018/0150739 A1* | 5/2018 | Wu | G06N 20/10 |
| 2018/0174020 A1* | 6/2018 | Wu | G06N 3/044 |
| 2018/0203851 A1* | 7/2018 | Wu | G06N 3/044 |
| 2018/0204111 A1* | 7/2018 | Zadeh | G06N 3/0464 |
| 2018/0204576 A1* | 7/2018 | Dhoot | H04L 65/1083 |
| 2019/0028509 A1* | 1/2019 | Cidon | H04L 63/1425 |
| 2019/0050875 A1* | 2/2019 | McCord | G06N 3/092 |
| 2019/0102696 A1* | 4/2019 | Guidotti | G06N 20/00 |
| 2019/0279281 A1* | 9/2019 | Kumar | G06Q 30/0631 |
| 2020/0184278 A1* | 6/2020 | Zadeh | G06N 3/044 |
| 2020/0195683 A1* | 6/2020 | Kuppa | G06F 21/554 |
| 2020/0202280 A1* | 6/2020 | Yip | G06F 40/289 |
| 2021/0049700 A1* | 2/2021 | Nguyen | G06N 3/09 |
| 2021/0157858 A1* | 5/2021 | Stevens | G06F 40/237 |
| 2022/0059083 A1* | 2/2022 | Muller | G06N 3/09 |
| 2022/0108697 A1* | 4/2022 | Saeki | G10L 15/26 |
| 2024/0232539 A1* | 7/2024 | Venkateshwaran | G06N 3/044 |

FOREIGN PATENT DOCUMENTS

| | | | |
|---|---|---|---|
| JP | 2011081627 A | 4/2011 | |
| JP | 2019105979 A | 6/2019 | |
| WO | 2017094202 A1 | 6/2017 | |
| WO | WO-2020231453 A1 * | 11/2020 | G06F 40/56 |

OTHER PUBLICATIONS

Ding et al., title={Learning stylometric representations for authorship analysis}, journal={IEEE transactions on cybernetics}, vol.={49}, No.={1}, pp.={107-121}, year 2017, publisher IEEE (Year: 2017).*

Kuznetsov et al., title={Methods for Intrinsic Plagiarism Detection and Author Diarization.}, booktitle={CLEF (Working notes)}, pp.={912-919}, year={2016} (Year: 2016).*

Liu et al.,Discovering sentiment sequence within email data through trajectory representation, Expert Systems with Applications, vol. 99, Jun. 1, 2018, pp. 1-11 (Year: 2018).*

Vysotska et al., Vysotska, Authorship Identification of the Scientific Text in Ukrainian with Using the Lingvometry Methods, 2018, IEEE CSIT 2018, Sep. 11-14, 2018, Lviv, Ukraine, pp. 34-38. (Year: 2018).*

Ratanamahatana, C., et al., "Mining Time Series Data", Chapter 51, Citeseer, 2006, 36 pages.

* cited by examiner 100 text analysis system 120 feature extraction portion

Unicode Text

| | |
|---|---|
| A | 0000 0000 0100 0001 |
| S | 0000 0000 0101 0011 |
| C | 0000 0000 0100 0011 |
| I | 0000 0000 0100 1001 |
| I | 0000 0000 0100 1001 |
| | 0000 0000 0010 0000 |
| 天 | 0101 1001 0010 1001 |
| 地 | 0101 0111 0011 0000 |
| | 0000 0000 0010 0000 |
| ﺞ | 0000 0110 0011 0011 |
| ﺩ | 0000 0110 0100 0100 |
| ﻭ | 0000 0110 0011 0111 |
| ﻩ | 0000 0110 0100 0101 |
| | 0000 0000 0010 0000 |
| α | 0000 0011 1011 0001 |
| κ | 0010 0010 0111 0000 |
| γ | 0000 0011 1011 0011 |

FIG. 3 input waveform extract feature(s)
to reproduce input ⇩ output waveform learn to reproduce input

| | Japanese | English | Chinese | Taiwanese | Korean | Hindi | Finnish | French |
|---|---|---|---|---|---|---|---|---|
| A(trained) | 2 | 3 | 0 | 2 | 1 | 4 | 2 | 9 |
| B | 94 | 82 | 73 | 74 | 100 | 59 | 56 | 38 |
| C | 97.1 | 97.1 | 55.9 | 61.8 | 97.1 | 35.3 | 85.3 | 47.1 |
| D | 76 | 46 | 29 | 33 | 100 | 19 | 20 | 20 | ratio of detection as another user

FIG. 12

TEXT ANALYSIS SYSTEM, AND CHARACTERISTIC EVALUATION SYSTEM FOR MESSAGE EXCHANGE USING THE SAME

CROSS-REFERENCE TO RELATED APPLICATIONS

This application is a continuation of U.S. application Ser. No. 17/639,866, filed on Mar. 2, 2022, which is a National Stage of International Application No. PCT/JP2019/034402, filed on Sep. 2, 2019, which applications are hereby incorporated by reference in their entirety. This application is related to the co-pending Japanese patent application JPWO2021044475A1.

TECHNICAL FIELD

The present disclosure relates to a text analysis system and a feature evaluation circuit in message exchange using the same.

BACKGROUND

An approach to making a computer understand the natural language used by humans for information transmission is called natural language understanding. Information processing systems that use natural language understanding are widely used in fields such as automatic text translation, voice response systems, robotics, and security. The development of Internet technology facilitates multilateral cultural and business exchanges; thus, a wide variety of languages or mixed multilingual languages has to be handled in real-time. As an example of dealing with multiple languages, in an e-mail system that is a type of message exchange on the Internet, servers and terminal devices, providing an efficient matching system with predetermined definition files in a wide variety of languages in the filtering function to detect malicious messages such as spam and viruses, have been put into practical use.

For example, Japanese Patent No. JP6267830B2 discloses a technique where sample data, in which character strings or the like are described, is signalized as n-valued sample data (n is a natural number of 2 or more), the similarity between the n-valued sample data and n-valued input data is calculated, and the input data is identified whether or not spam mail based on the calculated similarity.

SUMMARY

With the development of Internet technology, multilateral cultural and business exchanges have become active, and information processing systems are required to support the processing of a wide variety of languages. In addition, the e-mail system, which is a type of message exchange system on the Internet, requires the performance of handling a large amount of traffic in real-time in addition to handling a wide variety of languages. However, natural language understanding requires a huge amount of data, not only a simple matching table, and requires a complicated analysis based on syntax and semantics.

The purpose of processing a message written in natural language is not only to understand the content but also to acquire the characteristics or features of the message creator. The characteristics or features of message creators are also utilized in the field of information security. Information leakage due to obstruction of operation of computer devices and electronic devices using messages, information fraud, fraudulent acts against users, etc. is a big problem, and there is a high demand for information leakage prevention by message analysis. In addition to this, high-speed processing is also required. There are two main types of information leakage in messages. One is a deliberate outflow by a malicious user.

For example, a collaborator for fraud sends information externally using a messaging tool or the like or infects a computer with a malicious program such as malware to leak the information to an external computer.

As another example, an erroneous transmission is made by the user. For example, the user sends a message to an unknown destination, uses a topic or term that he does not normally use, or attaches a file that he does not normally attach.

A common feature of these is that these behaviors by the user are not usual. Therefore, it is possible to prevent information leakage due to message exchange by detecting the peculiarity existing in the message at high speed and by paying attention before transmission.

Considering the above, the present disclosure intends to provide a text analysis system that is low-cost and fast compared to the conventional technique and is able to detect text with a specific expressive and structural feature. Further, the present disclosure intends to provide a feature evaluation circuit for detecting an anomaly in a text body in a message exchange.

The present disclosure achieves a system capable of processing a wide variety of languages with a single algorithm. The present disclosure for text analysis systems can be applied to the detection of features and exceptions of spoken language and sentences. The present disclosure can discover differences in meaning, misunderstandings, injustices, and their signs caused by wording errors and irregularities, and can detect extraordinary ideas buried in mediocre ideas and a small number of intentions among great numbers.

By extracting the expressive and structural features of spoken language and text, and comparing the extracted features with the spoken words and text to detect the different characteristics or features, or by using the opposite method, the text analysis system of the present disclosure can be used in a wide variety of ways.

Consider information leakage in an e-mail system as a specific example of what can be detected by comparing the expressive and structural features of spoken language and texts. Most of the methods for identifying malicious messages such as spam emails and virus emails detect the results of morphological analysis of the message body and the characteristics of header information including URLs and sending addresses, and compare the predefined criteria (malicious term, Address, URL, passage route, transmission amount, etc.) for determining malicious messages (illegal terms) and the characteristics of emails normally exchanged between the parties with the differences, for identifying. Since URLs and headers have formal information, it is easier to define the judgment criteria than that of the message body; however, these characteristics are changed continuously. Thus, high-precision filtering may be difficult.

Therefore, detection based on the analysis of the message body is advantageous in addition to the URLs and header information, but the languages included in the malicious message are multilingual, and in order to support morphological analysis and word-separation processing in multiple languages, a dictionary corresponding to each language is required. Due to the diversity of languages, there is a concern that extensibility will decrease and the processing speed of systems requiring real-time processing will decrease significantly. For avoiding them, the system equipment becomes enormous and the cost increases. Therefore, the sentence analysis method of the present disclosure, which is inexpensive and has expandability to a wide variety of languages, can be expected to provide a solution.

A text analysis system for analyzing text according to the present disclosure includes a conversion circuit for converting characters of the acquired text data into a numerical form to convert the text data into a time series signal(s); a feature extraction circuit for extracting feature information from the converted time series signal to store the extracted feature information; and a determination circuit for determining an identity of text data newly acquired by using the feature information.

In an embodiment, the text analysis system further includes a detection circuit for detecting anomalous text different from the feature information, based on a determination result by the determination circuit.

In an embodiment, the conversion circuit converts characters into numerical data based on a predetermined conversion table. In an embodiment, the conversion circuit normalizes the time series signal to converge them into the range from a minimal value "0" to a maximum value "1." In an embodiment, the conversion circuit attenuates a value(s) of the time series signal that is more than a set threshold to normalize the attenuated time series signal.

In an embodiment, the feature extraction circuit extracts a feature(s) from the normalized time series signal of text data written with a normal expressive feature or structural feature and learns the feature to acquire the output waveform that reproduces the input waveform of the time series signal by using the extracted feature. In an embodiment, the feature extraction circuit encodes the feature information by an auto-encoder. In an embodiment, the feature extraction circuit learns the feature information using a neural network.

A feature evaluation circuit for message exchange according to the present disclosure includes the above-described text analysis system, and the detection circuit detects an anomaly in an outgoing e-mail based on the determination result by the determination circuit. In an embodiment, the feature evaluation circuit for message exchange further includes a transmission control circuit for halting the transmission of outgoing mail when an anomaly is detected in the outgoing mail. In an embodiment, the feature evaluation circuit for message exchange further includes a notification circuit for notifying the halt of the transmission of the outgoing email when the transmission of the outgoing emails is halted by the transmission control circuit.

A text analysis program executed by a computer terminal according to the present disclosure includes the steps of acquiring text data; converting characters of the acquired text data into a numerical form to convert the text data into a time series signal; extracting feature information from the converted time series signal to store the extracted feature information; and; determining an identity of text data newly acquired by using the feature information.

In an embodiment, the step of determining an identity includes identifying an outgoing e-mail written with an expressive feature or structural feature different from the feature information.

A text analysis method in a computer terminal according to the present disclosure includes the steps of acquiring text data; converting characters of the acquired text data into a numerical form to convert the text data into a time series signal; extracting feature information from the converted time series signal to store the extracted feature information; and determining an identity of text data newly acquired by using the feature information.

In an embodiment, the step of determining an identity includes identifying an outgoing e-mail written with an expressive feature or structural feature different from the feature information.

According to the present disclosure, since the text data is converted into a time-series signal, it is possible to reduce the cost without requiring morphological analysis of the texts or sentences and dictionary data for that purpose.

Furthermore, by determining the identity of the text or sentence data based on the feature information extracted from the time-series signal, it is possible to easily determine whether or not the sentence is a sentence of the person himself/herself.

Furthermore, according to the present disclosure, by detecting the peculiarity of the sent mail, it is possible to prevent information leakage by stopping the transmission of the abnormal sent mail.

BRIEF DESCRIPTION OF THE DRAWINGS

For a more complete understanding of the present disclosure and the advantages thereof, reference is now made to the following descriptions taken in conjunction with the accompanying drawings, in which:

FIG. 3 is an example of a part of Unicode;

FIG. 12 is a graph showing another experimental result according to an embodiment of the present disclosure.

Figure 1:
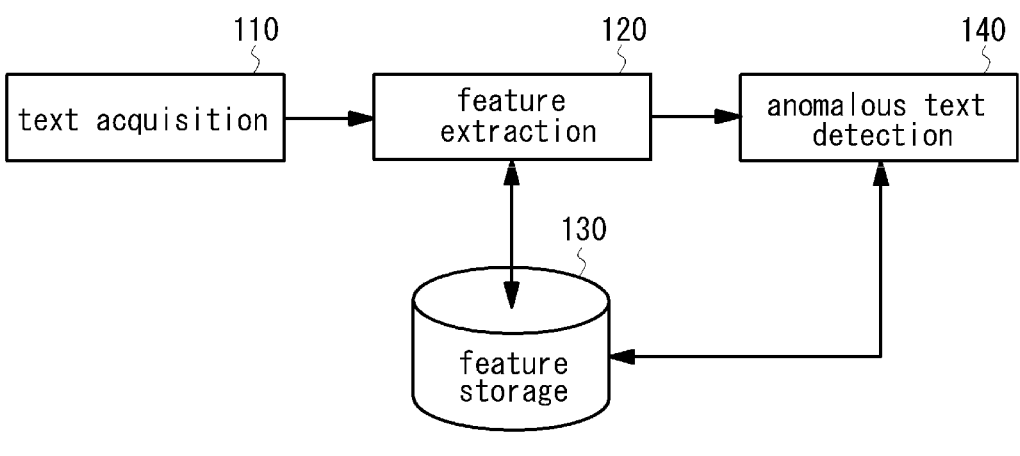
FIG. 1 is a block diagram illustrating a structure of a text analysis system according to a first embodiment of the present disclosure.

Embodiments can be implemented in hardware, software, or in any combination thereof.

DETAILED DESCRIPTION OF ILLUSTRATIVE EMBODIMENTS

The following reference numerals can be used in conjunction with the drawings:

100: text analysis system
110: text acquisition circuit
120: feature extraction circuit 130: feature storage circuit 140: anomalous text detection circuit 200: outgoing email monitoring system 210: outgoing email acquisition circuit 220: feature extraction circuit 230: feature storage circuit 240: anomalous email detection circuit 250: output control circuit A text analysis system according to the present disclosure may be applied to any electronic devices having functions to electronically process text, such as computer devices, mail servers, client terminals, smartphones, and the like.

FIG. 1 is a diagram illustrating an example of a structure of a text analysis system according to an embodiment herein. According to the embodiment, a text analysis system 100 includes a text acquisition circuit 110 for acquiring text data, a feature extraction circuit 120 for extracting feature(s) of the text data acquired in the text acquisition circuit 110, a feature storage circuit 130 for storing the feature extracted by the feature extraction circuit 120, and an anomalous text detection circuit 140 for detecting anomalous text based on the feature in the feature extraction circuit 120 or the feature storage circuit 130.

In embodiments, the text analysis system 100 is implemented by software such as a mail server and a client terminal etc., hardware, or the combination of software and hardware. The text acquisition circuit 110 acquires text data (for example, electronic mail etc.) written by a user. In the case where text data is an electronic mail (e.g., an electronic mail in HTML form written using a mailing software loaded in a client terminal), an electronic mail sent from a client terminal to a mail server through the internet, or an electronic mail in a message exchange system is acquired.

The text acquisition circuit 110 may acquire text data written by multiple users. To provide a learning function to the text analysis system 100 in advance, text data acquired by the text acquisition circuit 110 is normal text data that is written in accordance with the user's normal behaviors, i.e., written with a normal expressive feature or structural feature.

The feature extraction circuit 120 extracts a feature included in normal text data written with the normal expressive feature or structural feature of the user and learns the feature of the user's text. After learning by the text analysis system 100, the text acquisition circuit 110 acquires optional text data and the text analysis system 100 identifies whether a feature of the optional text data corresponds to the feature of text written with the normal expressive feature or structural feature.

For example, for a text written by one user, it is identified whether the text is written with the normal expressive feature or structural feature or whether the text is written by another user.

Figure 2:
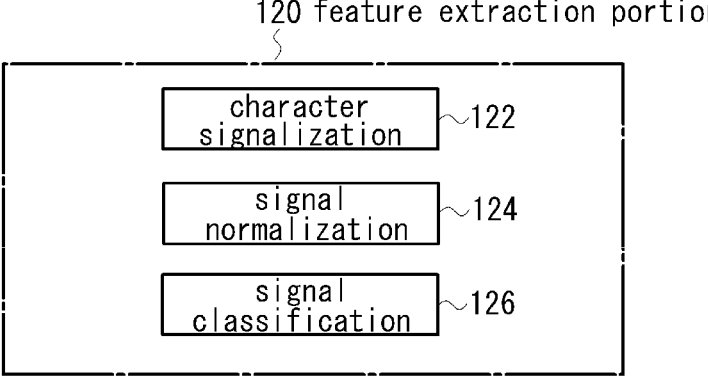
FIG. 2 is a block diagram illustrating an internal structure of a feature extraction circuit shown in FIG. 1.

FIG. 2 shows an internal structure of the feature extraction circuit 120. The feature extraction circuit 120 includes a character signalizing circuit 122 for receiving text data acquired in the text acquisition circuit 110 to convert characters described in a text to time series signals, a normalization circuit 124 for normalizing the time series signals that are converted into signals by the character signalizing circuit 122, and a signal classification circuit 126 for classifying the normalized signals.

The character signalizing circuit 122 converts a series of characters described in a text into one-dimensional time series signals. In one preferred example, the character signalizing circuit 122 converts each of the characters in the text into numerical data based on Unicode. Unicode is one of the international standards for character code, where codes are assigned to characters, numbers, or symbols of various languages in the world.

FIG. 3 shows an example of a part of Unicode. In Unicode, ASCII, Chinese characters, Arabic, and Greek symbols, etc. are coded to binary data in 16-bit or more. The character signalizing circuit 122 may have the amount of data in which the number of bits per numerical value is converted from one character multiplied by the number of characters. Also, the character signalizing circuit 122 may convert fixed-length data to one continuous sequence data or to varying-length data.

In another example, a conversion table may be previously prepared in which the relationship between character, idiom, phrase, etc., and numerical data is uniquely defined. The character signalizing circuit 122 may convert each character or idiom etc. in a text to numerical data by using the conversion table.

The character signalizing circuit 122 converts characters from the first to the last in a text to numerical data. For example, if the text has the size of P row(s)×Q column(s) (P and Q are any integer number), time series signals including binary value data corresponding to the number of characters in P×Q may be generated.

In this case, the character is a concept including characters in natural language, numbers, symbols, figures, and blank (space) without any characters. For example, for a text in horizontal writing, characters may be sequentially scanned from the first line to the last line, from left to right, or from right to left. Alternatively, for text in vertical writing, characters may be sequentially scanned from the first line to the last line, from the top to the bottom or from the bottom to the top. Thus, characters from the first to the last may be converted to numerical data. The scanning direction may be optionally determined. If page information configuring text data (the number of lines, the number of characters in one line) is required, the page information may be acquired at the same time. Thus, characters from the first to the last may be identified in reference to the page information.

The time series signals generated by the character signalizing circuit 122 may be regarded as a non-periodic waveform comprised of characters in the text. Words or idioms included in the text are expressed as a waveform pattern. For example, when a user uses a word or idiom "XX" frequently, a waveform pattern corresponding to "XX" may be included in the time series signals. Alternatively, when the user writes a text in polite language or uses a lot of punctuation or a lot of certain conjunction with a normal expressive feature or structural feature, a waveform pattern expressing them may be included. Such waveform pattern is one feature for identifying the user.

The character signalizing circuit 122, according to an embodiment herein, converts characters into signals based on Unicode or the conversion table. Thus, it may be applied to multiple languages without depending on a certain language. Language differences may be expressed as the difference in waveforms of time series signals. Further, the character signalizing circuit 122 does not perform morphological analysis or syntax analysis, so dictionaries such as corpus, etc. are not required, which reduces cost.

The signal normalization circuit 124 normalizes a time series signal generated by the character signalizing circuit 122. When characters are converted into numerical form by Unicode, each numerical value for generating a time series signal is expressed in a discrete value whose range may be extremely large. Thus, the signal normalization circuit 124 performs a process for suppressing outliers of the time series signals and a process for normalizing the range.

By the process of suppressing outliers, a numerical value that is more than a preset threshold value is attenuated. For example, the process is performed by the following equation, where "avg" is an average, "std" is a standard deviation, "x" is a target value (in this case, a numerical value of a time series signal), "rate" is an attenuation rate, and "d" is a coefficient that is multiplied by a numerical value to be added for raising the overall value.

$$\text{threshold} = |\text{std} - \text{avg}| \times (1 - d)$$

$$\text{avg} + ((x - \text{avg}) \times \text{rate} + (|x - \text{avg}| \times d)) : (|x - \text{avg}| > \text{threshold})$$

$$x : (|x - \text{avg}| \leq \text{threshold}) \qquad \text{Equation 1}$$

The threshold value (threshold) is set inside by an infinitesimal d from a point away from the average by σ, as described above (|standard deviation−average value|×(1−d)). That is, since the degree away from the average value is referenced, the target value is also divided to cases by reference to the degree away from the average value |x−avg|.

Then, for a signal for which the process of suppressing outliers is performed, the process of normalization of the range is performed. In the process of normalization of the range, the standard deviation (std) is normalized to 1 and the average (avg) is normalized to 0, after that, the minimum value is normalized to 0 and the maximum value is normalized to 1, such that the time series signals are converged into the range of 0-1.

Figure 4:
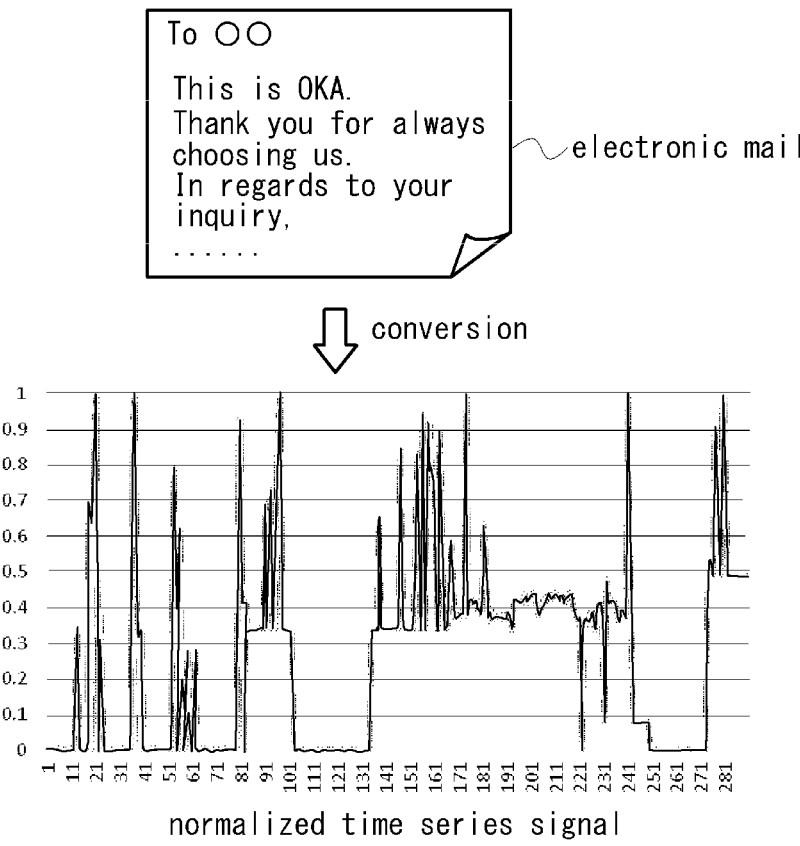
FIG. 4 is an example illustrating that electronic mail is acquired as text data and a time series signals of the electronic mail are normalized.

FIG. 4 shows an example of a normalization, where characters of the body of an electronic mail are converted to time series signals when the electronic mail is received as text data, and the time series signals are normalized to be converged to the range of 0-1.

Figure 5:
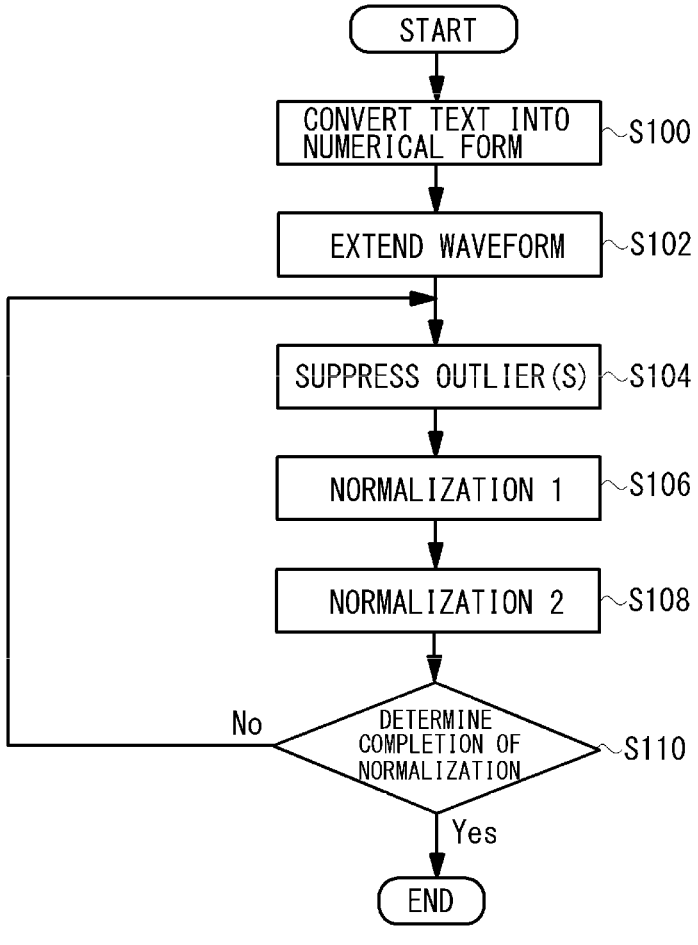
FIG. 5 is a flow chart illustrating an example of an operation of a signal normalization according to an embodiment of the present disclosure.

FIG. 5 shows a flow chart for an example of an operation of the signal normalization circuit 124 according to an embodiment herein. First, each character in an acquired text is converted into a numerical form by the character signalizing circuit 122, for example, based on UNICODE, at step S100. Then, the numerical value of the time series signals is multiplied by an integer by the signal normalization circuit 124 to extend a waveform at step S102. The numeral value may be adjacent due to languages, this process is performed to correct it.

Then, the process for suppressing outliers is performed by the signal normalization circuit 124, as shown above in step S104. In the process of suppressing outliers, numerical values more than the threshold value are attenuated. The attenuation may be performed multiple times, at step 106. The number of times of attenuation may be adjusted according to the data. Then, the variance and the average are normalized by the signal normalization circuit 124, after that, the minimum value is normalized to "0" and the maximum value is normalized to "1." Unless the value of the variance is below a certain threshold value, the processes of steps S104-S108 are repeated. An upper limit may be set to the number of times of the repeated process.

Figure 6:
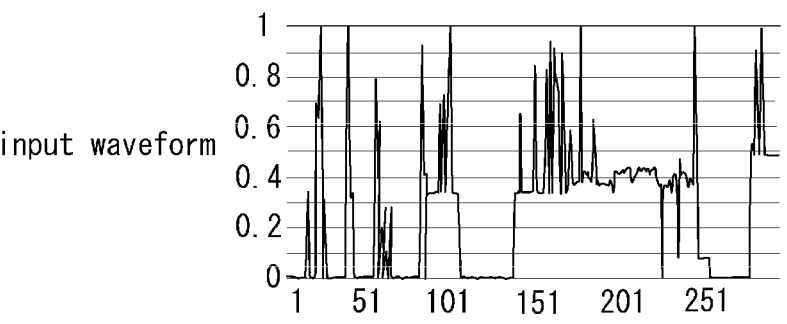
FIG. 6 is a diagram illustrating a feature extraction from an input by a signal classification circuit according to an embodiment of the present disclosure.
Figure 6:
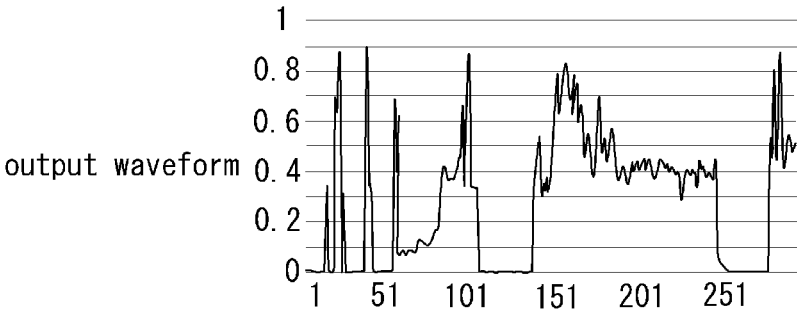

Now, the signal classification circuit 126 is explained. The signal classification circuit 126 receives a normalized time series signal from the signal normalization circuit 124 to extract a feature included in the time series signal. The extracted feature is the one from which the input can be reproduced. The signal classification circuit 126 learns the feature. The signal classification circuit 126 learns text data only that includes a normal expressive feature or structural feature. For example, a feature is extracted from the normalized input form as shown in FIG. 6. To acquire output waveforms that can reproduce almost input waveforms by using the extracted feature, the feature is learned.

Figure 7:
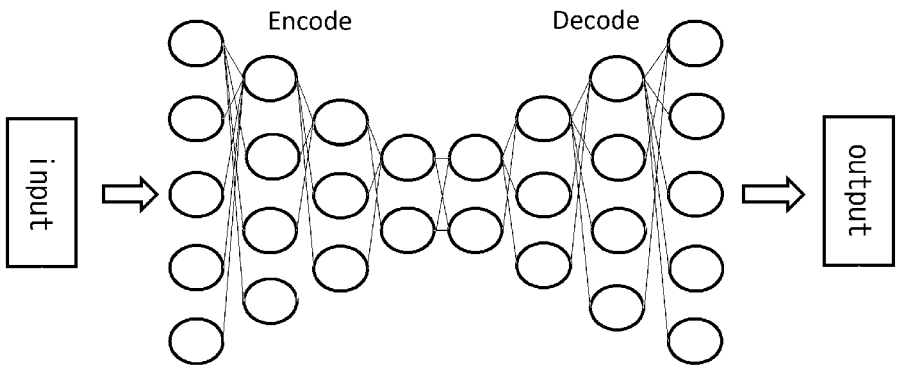
FIG. 7 is a diagram illustrating an auto-encoder according to an embodiment of the present disclosure.

In one preferred aspect, the signal classification circuit 216 reduces the dimensionality(s) of the feature by an auto-encoder using a neural network and suppresses the amount of information. FIG. 7 shows a concept of the auto-encoder using a neural network. In a preferred aspect, the auto-encoder is configured with fully connected layers only and includes four encoder layers and four decoder layers. The width of each layer of the neural network is variable according to the length of a signal converted from the character string. The encoder reduces the unrequired dimensionality(s) of input to compress the feature. The decoder reproduces the input from the compressed feature. The neural network adjusts the respective weights of the encoder and the decoder by using the learning function. In this example, the neural network reproduces the input with a symmetrical configuration. In embodiments, the input has a fixed length.

The signal classification circuit 126 also includes a function to inspect the reproducibility of the output waveform. Specifically, the distances between each point in two time series of the input waveform and the output waveform as shown in FIG. 6 are compared in a round-robin manner to detect a path with the shortest distance of two time series. The path is regarded as DTW (Dynamic Time Warping) distance. While the reproduced waveform has some deviations, the inspection is tough to phase shift, etc. The DTW distance is used to measure the reproducibility of new data after the learning model is defined. In this case, new data is new text data that is determined whether or not it is unique by the text analysis system 100. New text data is processed by the auto-encoder. When the DTW distance of input/output waveforms is more than a threshold value (described later), the reproducibility is low and the text data is determined as unique data (that has no normal expressive feature or normal structural feature). The determination result is provided to the anomalous text detection circuit 140.

The signal classification circuit 126 calculates a threshold value for classifying waveforms. Specifically, evaluation data, i.e., a feature that is extracted from a text (sentence) written by a normal expressive feature or structural feature and is compressed by the auto-encoder (which is expressed as the weight of the auto-encoder, for example, as coefficients of the equation which each neuron has) is evaluated to calculate identity. Then, the median value and the standard deviation of the identity are obtained and a threshold value is calculated by the following equation. The threshold value means that almost 95% of waveforms are included within the range from the median value to the standard deviation*2 if the waveforms show generally a normal distribution.

$$\text{threshold value} = \text{median value} - \text{standard deviation} \times 2 \qquad \text{Equation 2}$$

The threshold value is not limited to the above equation. If waveforms are closer to a normal distribution, threshold value=mean value−standard deviation*2(2σ) may be employed. When the similarity of waveforms is calculated by another equation, a threshold value may be based on this equation.

Figure 8:
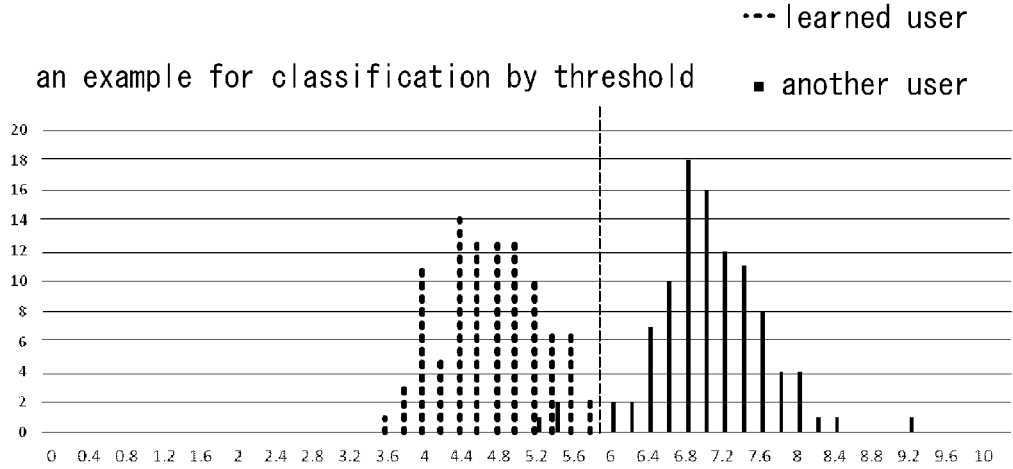
FIG. 8 is a diagram illustrating an example of a classification by a threshold of the signal classification circuit.

FIG. 8 shows an example of a classification according to a threshold value. In a graph of FIG. 8, dashed lines are one user's text that has already been learned, and solid lines are another user's text. In this example, the threshold value of the feature is 5.8. A text that has a feature more than this value is detected as another user's text.

The feature storage circuit 130 stores a feature extracted by the feature extraction circuit 120 and its threshold value. Each time text data is learned, the feature and the threshold value are updated.

After pre-learning by the feature extraction circuit 120 is completed, the anomalous text detection circuit 140 detects anomalous text by using the result of the pre-learning. That is, an arbitrary text A is obtained by the text acquisition circuit 110, then the feature of the text A is extracted by the feature extraction circuit 120. The signal classification circuit 126 compares the feature extracted from text A with a threshold value stored in the feature storage circuit 130. When the feature is more than the threshold value, text A is determined as anomalous text. The result of the determination is provided to the anomalous text detection circuit 140. The anomalous text detection circuit 140 detects that text A determined as anomalous text is not written with a normal expressive feature or structural feature. For example, text A is estimated as a text that is written by another user other than one user or a text that is written by the one user himself with a specific expressive feature or structural feature.

Figure 9:
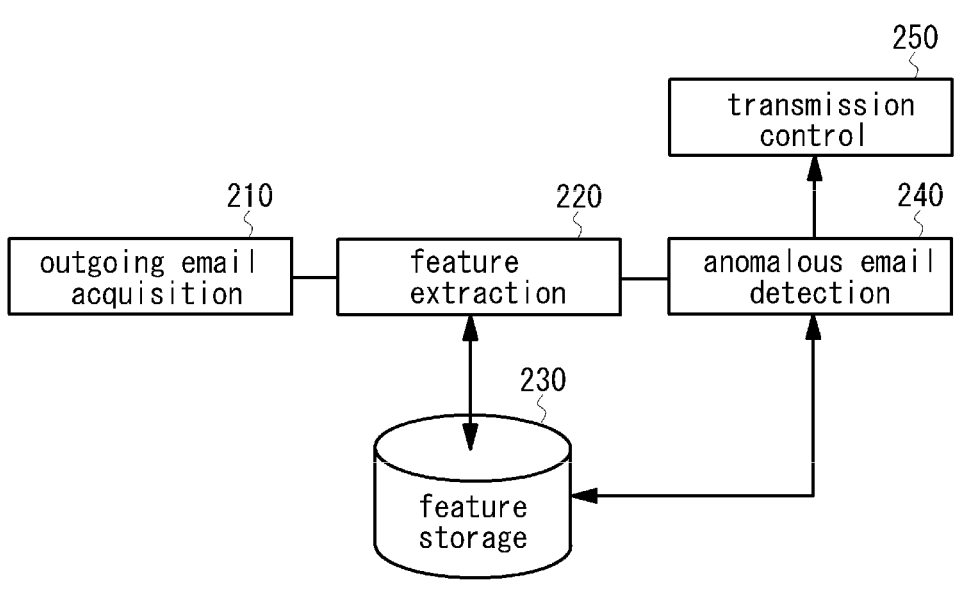
FIG. 9 is a block diagram illustrating a structure of an outgoing e-mail monitoring system according to a second embodiment of the present disclosure.

FIG. 9 shows an application example of a text analysis system according to an embodiment herein of an outgoing email monitoring system. An outgoing email monitoring system 200 may be achieved for example in a mail server, or client terminal (computer device, mobile device, etc.) with a mail sending/receiving function.

The outgoing email monitoring system 200 includes an outgoing email acquisition circuit 210 for acquiring outgoing mail written by a user; a feature extraction circuit 220 for extracting a feature of the outgoing mail that is acquired by the outgoing email acquisition circuit 210; a feature storage circuit 230 for storing the extracted feature; an anomalous email detection circuit 240 for detecting whether or not the acquired outgoing mail has anomalous; and a transmission control circuit 250 for controlling the transmission of the outgoing mail based on the detection result of the anomalous email detection circuit 240. These functions may be performed by software in a mail server or client terminal, hardware, or the combination of software and hardware.

The outgoing email acquisition circuit 210 acquires an electronic mail in HTML form written using mailing software that is mounted in a client terminal or acquires an electronic mail for sending uploaded from a client terminal to the mail server.

The feature extraction circuit 220 operates similarly to the feature extraction circuit 120 of the above-described text analysis system. For simplicity's sake, the feature extraction circuit 220 shall be preliminary learned a feature of an electronic mail that is written by user X with a normal expressive feature or structural feature. Accordingly, if an outgoing email acquired from the outgoing email acquisition circuit 210 is written by user X, the outgoing mail has the feature same as the learned feature. Thus, the outgoing mail is identified as mail that is written by user X with a normal expressive feature or structural feature. If an outgoing mail is written by user X with specific expressive or structural features or written by another user, the outgoing mail does not have the feature same as the learned feature. Thus, outgoing mail is identified as mail that is written by user X with specific expressive or structural features or written by another user. As shown in FIG. 8, whether or not the electronic mail has an identity is determined based on the threshold value.

When it is determined that an outgoing mail has no identity, the anomalous email detection circuit 240 detects the outgoing mail as anomalous mail and provides the detection result to the transmission control circuit 250. When anomalous mail is detected, the transmission control circuit 250 instructs, for example, a client terminal or mail server to halt or hold the transmission of the outgoing mail and alerts the user to non-delivery. For example, non-delivery is displayed on the display of the client terminal or voice guidance may be used. When anomalous mail is not detected, the outgoing mail is sent to the client terminal or mail server.

Figure 10:
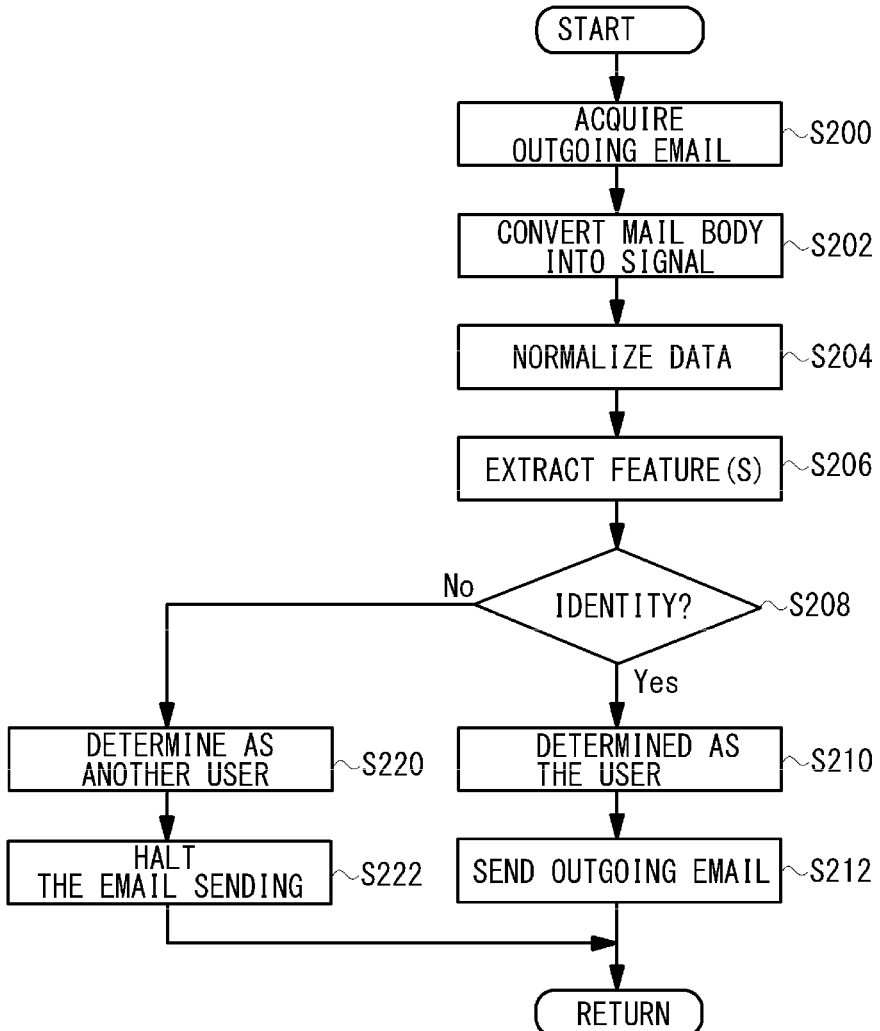
FIG. 10 is a flow chart illustrating an operation of the outgoing email monitoring system according to a second embodiment of the present disclosure.

FIG. 10 is a flow chart for explaining an example of an operation of the outgoing email monitoring system. First, outgoing mail is acquired by the outgoing email acquisition circuit 210 (S200). Then, each character of the body of the outgoing mail is converted into signals by the feature extraction circuit 220 to generate a one-dimensional time series signal (S202). The time series signal is normalized (S206). Then, a feature is extracted from the time series signals. Then, whether or not there is any identity between the extracted feature and the learned feature is determined (S208). When there is an identity, the outgoing mail is determined as the one that is written with the user's usual expressive or structural features (S210). Then, the outgoing mail is sent to a sending address (S212). When it is determined that there is no identity, the outgoing mail is determined as the one that is written by the user with specific expressive or structural features or written by another user (S220). Sending the outgoing mail is halted (S222).

Thus, according to embodiments herein, outgoing mail is determined if the mail is written with usual expressive or structural features. When the mail is written by the user with specific expressive or structural features or written by another user, sending of the outgoing mail is halted. Thus, information leaks by unsolicited outgoing mail may be prevented.

Now, an example of verification of the text analysis system according to an embodiment herein is described. In an experiment, four types of email magazines were used for evaluation. Only one email magazine A of the four email magazines was learned. It was evaluated whether or not the other three email magazines that were not targeted to learn are identified as the one other than email magazine A (That is, as shown in FIG. 8, it is evaluated whether or not email magazines more than a threshold value can be detected as the one that is written with specific expressive or structural features). Also, these four email magazines were translated into eight languages to verify the accuracy when the language is different.

Figure 11:
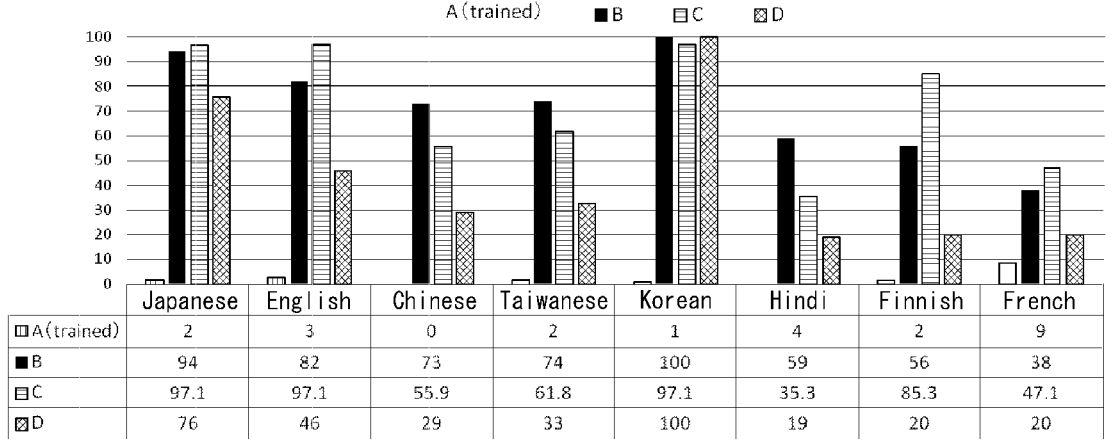
FIG. 11 is a graph showing one experimental result according to an embodiment of the present disclosure.

In the experiment, 1000 email magazines A were learned and each 100 email magazines of each of the other three were evaluated whether or not they are identified as the one other than email magazine A. FIG. 11 shows the probability that the email magazines in each language are identified as the one other than email magazine A. As seen in FIG. 8, the mail magazines B and C were identified with good probability, while the mail magazine D has some scatterings between languages. This is caused by the difference in feature(s) of each language. For example, the number of characters in the Japanese language is 50+50+lowercase characters+Chinese characters, the English language has 26 characters+their lowercase characters, the Chinese and Taiwanese languages have 87,000 characters (Unicode11), the French language have 26 characters+lowercase characters+7 characters, the Hindi language has 156 characters+lowercase characters, the Korean language has 11,172 characters, and the Finnish language has 29 characters+lowercase characters. Based on the language, the length of one sentence is different or the amplitude when converting into signals is different. Thus, the accuracy may be finally improved by optimal normalization.

Figure 12:
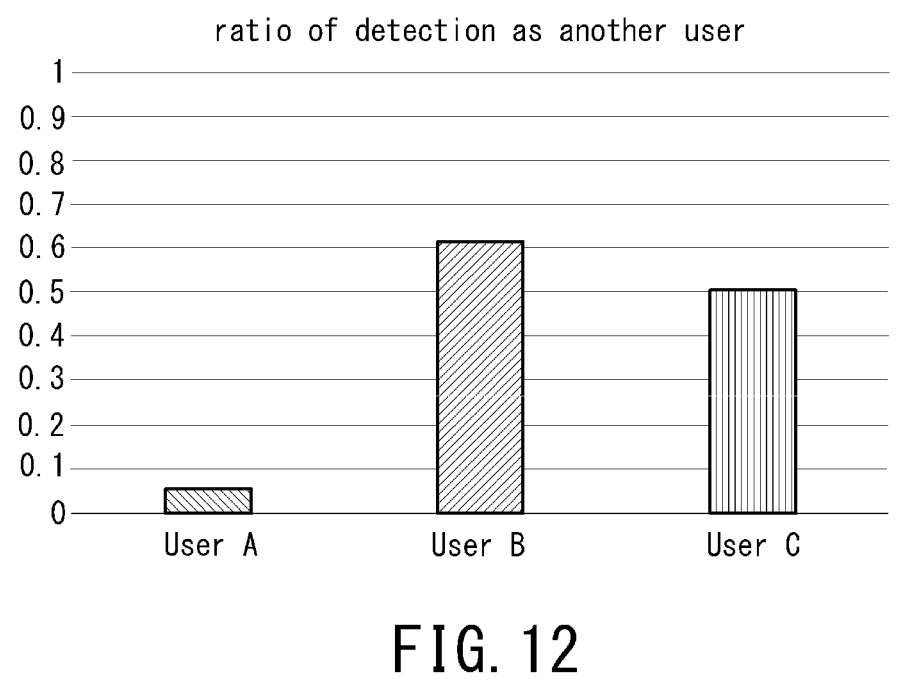

In another experiment, emails from three employees were evaluated. Users A and B were with a sales department and User C was with a quality management engineering department. In the experiment, emails by user A were learned. FIG. 12 is a graph showing a rate of whether or not users B and C are identified as the ones other than user A. The rate in which user A was identified as others (mail written with specific expressive or structural features) is 5.95%. The rate in which users B and C were identified as the ones other than user A (mail written with specific expressive or structural features) is 62.00% and 51.00%, respectively.

For emails, if the text is short, the difference is not sufficiently expressed, which causes low accuracy. Also, if the type of occupation is partially overlapped, the expressions is similar. Thus, it is expected that the difference is not sufficiently expressed.

While the preferred embodiments are described above in detail, the present disclosure is not limited thereto. Modifications or variations are possible within the scope of the claims.

What is claimed is:

1. A system for analyzing text, the system comprising:
a converter circuit for converting characters of the text into a numerical time series signal, wherein the numerical time series signal comprises a time series conversion of the characters in numerical format;
a feature extractor circuit for generating a waveform comprising extracted information from the numerical time series signal, wherein the extracted information comprises features based on politeness in language, a quantifiable use of conjunctions, use of idioms, or a combination thereof;
a determination circuit for determining whether the text is written by a specific user based on an analysis of the waveform against a threshold; and
a detector circuit for detecting anomalous text different from the extracted information based on a determination result from the determination circuit
wherein the system is part of a message exchange system,
wherein the text is part of a message communicated using the message exchange system,
wherein the message exchange system is for halting transmission of the message in response to an anomaly being detected based on an analysis of the waveform against the threshold, and
wherein the message exchange system generates a notification message to a user of the message exchange system in response to halting the transmission.

2. The system of claim 1, wherein the feature extractor circuit is for generating the waveform based on a trained neural network, wherein the trained neural network is trained using text previously written by the specific user.

3. The system of claim 1, wherein the system further comprises an acquisition circuit for acquiring the characters of the text.

4. The system of claim 1, wherein the converter circuit is for converting the characters of the text into the numerical time series signal based on a predetermined conversion table or using Unicode.

5. The system of claim 1, wherein the converter circuit is for attenuating a value of the numerical time series signal that is more than a set threshold to normalize the numerical time series signal.

6. The system of claim 1, wherein the feature extractor circuit is for encoding the extracted information using an auto-encoder, and wherein the feature extractor circuit learns to extract the extracted information using a neural network.

7. The system of claim 1, wherein the message exchange system is for determining whether to communicate the message based on the determination as to whether the message is written by the specific user.

8. The system of claim 1, wherein the extracted information further comprises features based on a quantifiable use of punctuations.

9. The system of claim 1, wherein the converter circuit is configured to normalize the numerical time series signal within a range between 0 and 1, inclusive.

10. A method for analyzing text, the method comprising:
converting characters of the text into a numerical time series signal, wherein the numerical time series signal comprises a time series conversion of the characters in numerical format;
generating a waveform comprising extracted information from the numerical time series signal, wherein the extracted information comprises features based on politeness in language, a quantifiable use of conjunctions, use of idioms, or a combination thereof;
determining whether the text is written by a specific user based on an analysis of the waveform against a threshold; and
detecting anomalous text different from the extracted information based on the determination result,
wherein the method is for a message exchange system,
wherein the text is part of a message communicated using the message exchange system,
wherein the message exchange system is for halting transmission of the message in response to an anomaly being detected based on an analysis of the waveform against the threshold, and
wherein the method further comprises generating a notification message to a user of the message exchange system in response to halting the transmission.

11. The method of claim 10, further comprising converting the characters of the text into the numerical time series signal based on a predetermined conversion table or using Unicode.

12. The method of claim 10, wherein the extracted information further comprises features based on a quantifiable use of punctuations.

13. The method of claim 10, further comprising encoding the extracted information using an auto-encoder, and wherein extracting the extracted information is performed using a neural network.

14. A device for analyzing text, the device comprising:
a non-transitory memory storage comprising instructions; and
a processor in communication with the non-transitory memory storage, the instructions, when executed by the processor, cause the processor to:
convert characters of the text into a numerical time series signal, wherein the numerical time series signal comprises a time series conversion of the characters in numerical format,
generate a waveform comprising extracted information from the numerical time series signal, wherein the extracted information comprises features based on politeness in language, a quantifiable use of punctuations, a quantifiable use of conjunctions, and use of idioms, and determine whether the text is written by a specific user based on an analysis of the waveform against a threshold; and detect anomalous text different from the extracted information based on the determination result, wherein the device is part of a message exchange system, wherein the text is part of a message communicated using the message exchange system, wherein the message exchange system is for halting transmission of the message in response to an anomaly being detected based on an analysis of the waveform against the threshold, and wherein the instructions, when executed by the processor, cause the processor to generate a notification message to a user of the message exchange system in response to halting the transmission.

15. The device of claim 14, wherein the instructions, when executed by the processor, cause the processor to convert the characters of the text into the numerical time series signal based on a predetermined conversion table or using Unicode.

16. The device of claim 14, wherein the extracting of the information is performed by a neural network trained on previous texts generated by the specific user.

17. The device of claim 14, wherein the instructions, when executed by the processor, cause the processor to:

detect an anomaly in the text based on a threshold difference in the features of a typical text written by the specific user and the text under analysis, wherein the detection is based on a learning model of a neural network trained using a plurality of previously written text by the specific user; and halt the transmission of the text under analysis based on the detection of an anomaly.

18. The device of claim 14, wherein the waveform includes a classification of the extracted information, and wherein the analysis of the waveform corresponds to an analysis of the waveform to a threshold set using a plurality of previously written text by the specific user.

19. The device of claim 14, wherein the threshold is determined based on a second waveform generated using a plurality of previously written text by the specific user.

20. The device of claim 14, wherein the message exchange system is configured to determine whether to communicate the message based on the determination as to whether the message is written by the specific user.

* * * * *